Jan. 27, 1953

J. H. STARR 2,626,551

CULTIVATOR

Filed Nov. 30, 1946

INVENTOR
JOHN H. STARR

BY

ATTORNEYS

Jan. 27, 1953            J. H. STARR            2,626,551
CULTIVATOR
Filed Nov. 30, 1946            4 Sheets-Sheet 2
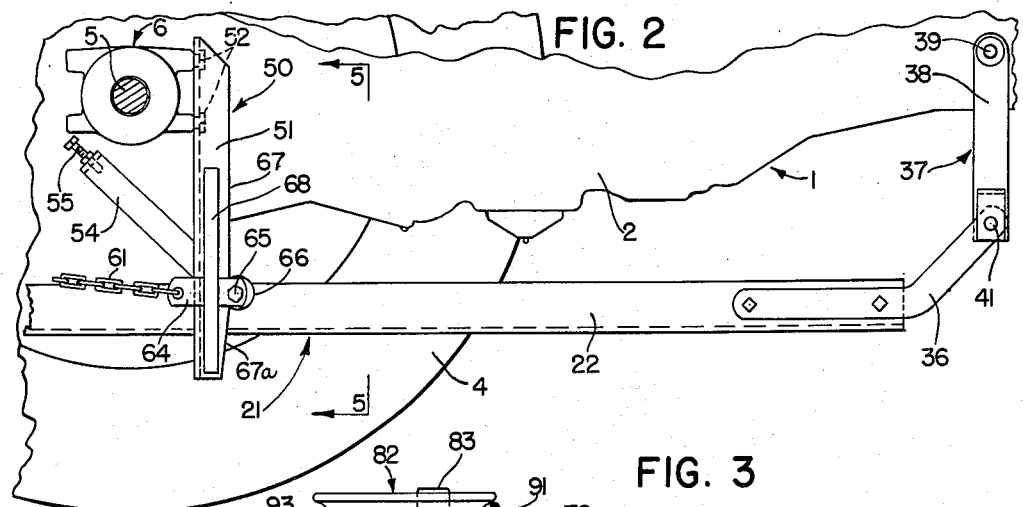
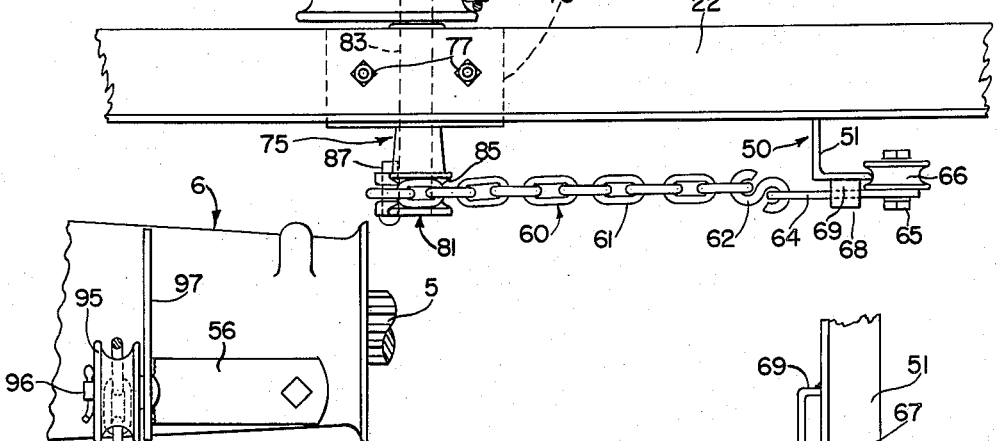
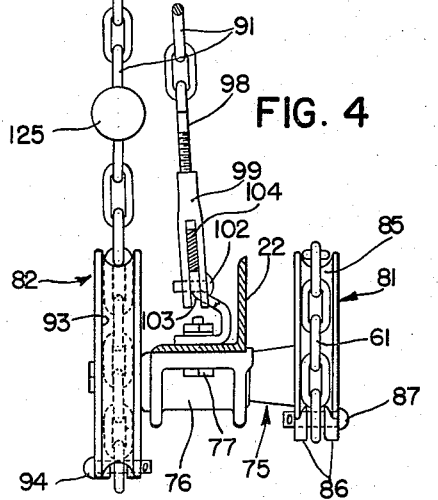
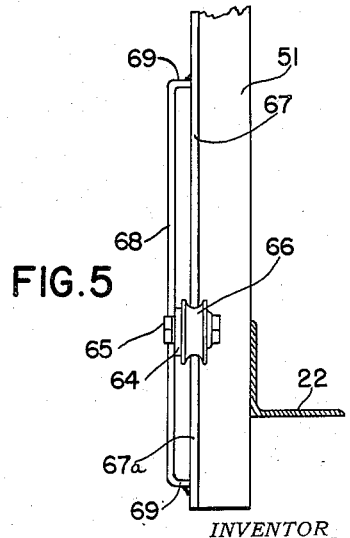
INVENTOR
JOHN H. STARR
BY *Jeffray R C Johnson*
ATTORNEYS Jan. 27, 1953   J. H. STARR   2,626,551
CULTIVATOR
Filed Nov. 30, 1946   4 Sheets-Sheet 3
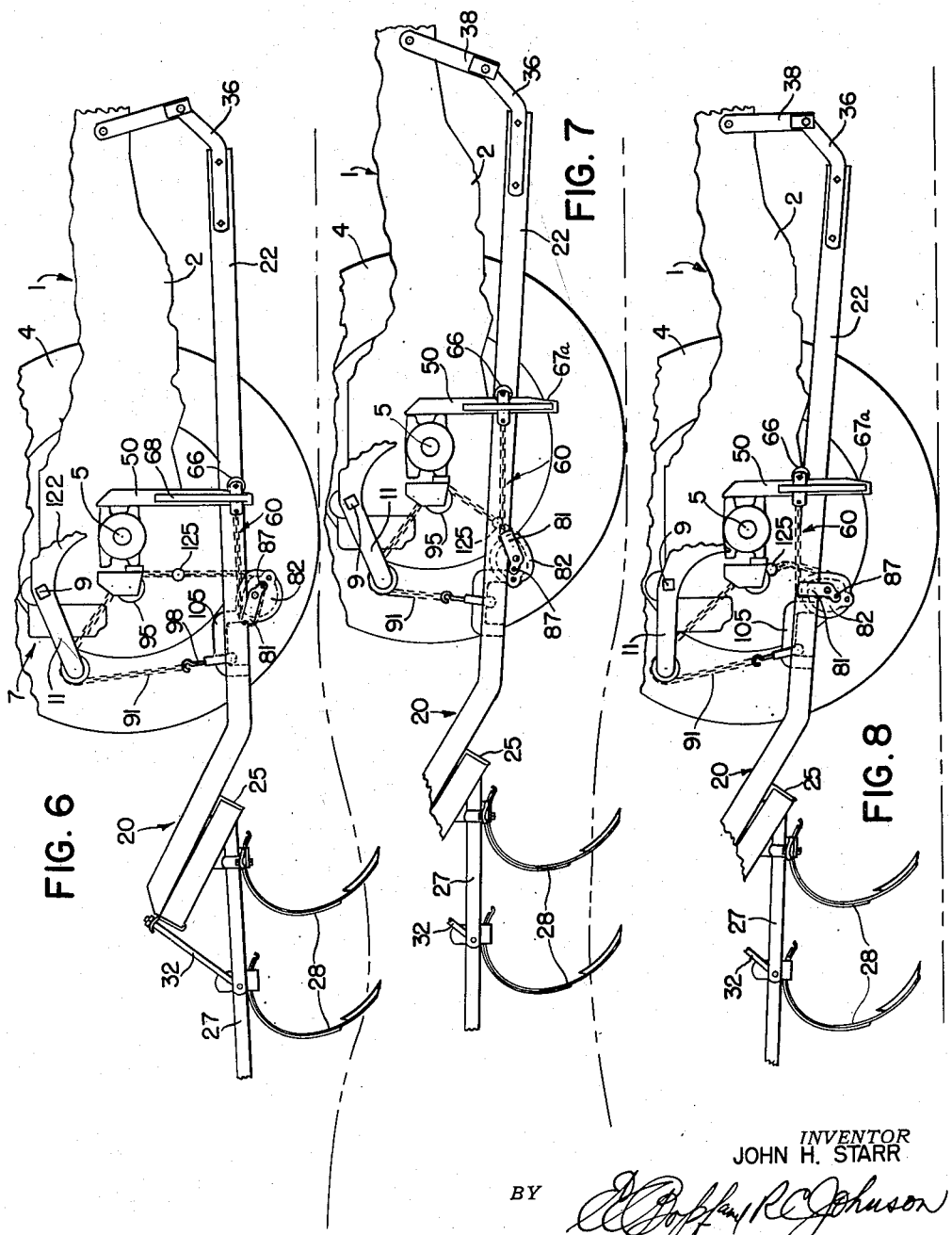
INVENTOR
JOHN H. STARR
BY
ATTORNEYS Jan. 27, 1953  J. H. STARR  2,626,551
CULTIVATOR
Filed Nov. 30, 1946  4 Sheets-Sheet 4
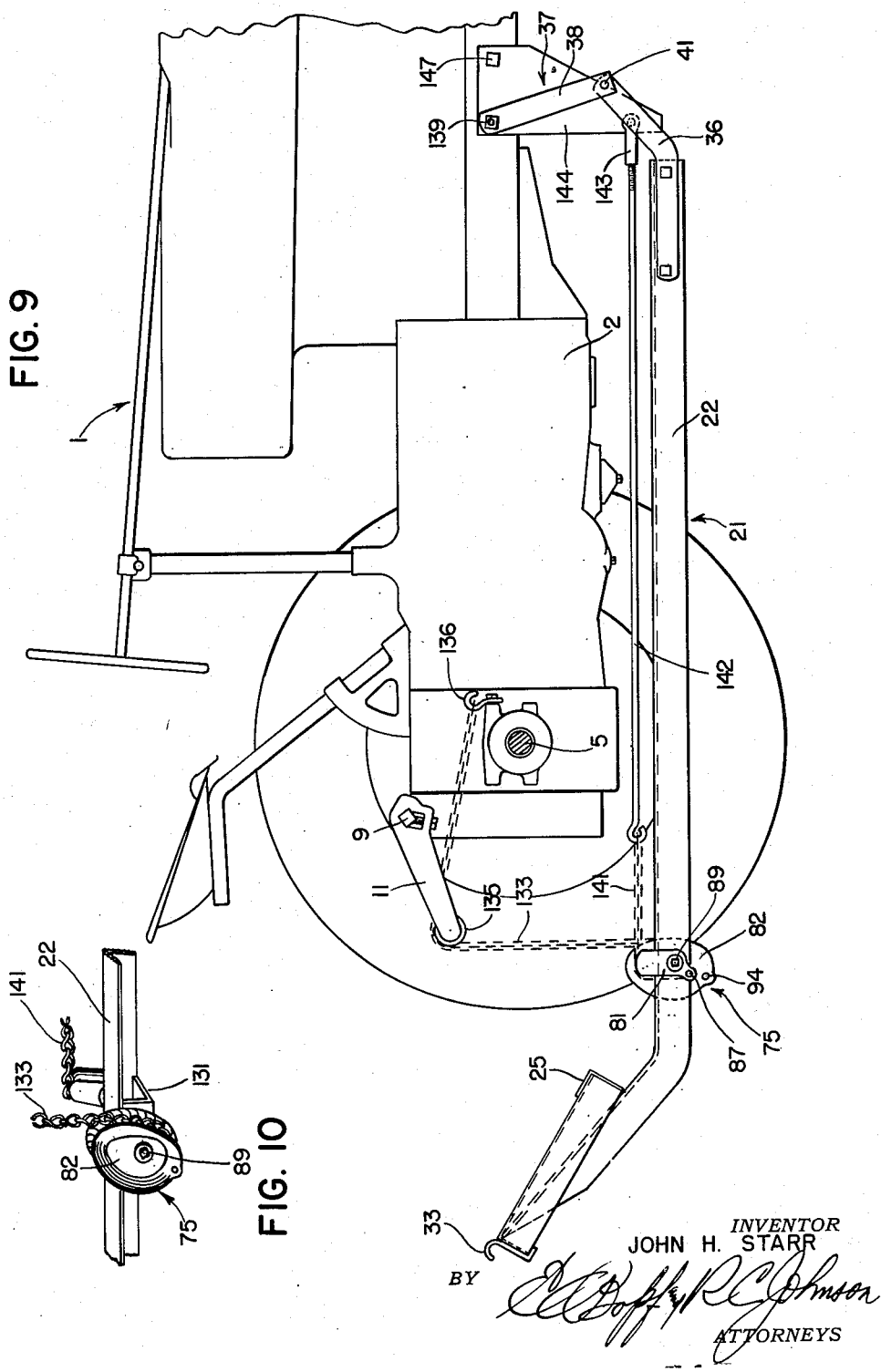
INVENTOR
JOHN H. STARR
BY
ATTORNEYS Patented Jan. 27, 1953

2,626,551

UNITED STATES PATENT OFFICE 2,626,551

CULTIVATOR

John H. Starr, Mayville, Wis., assignor to John Deere Van Brunt Company, a corporation of Wisconsin Application November 30, 1946, Serial No. 713,340

17 Claims. (Cl. 97—47)

The present invention relates generally to agricultural implements and more particularly to implements that are adapted to be mounted on a tractor to be propelled thereby and controlled by the operator on the tractor.

The object and general nature of the present invention is the provision of an agricultural implement having new and improved means for hitching the implement to the tractor so as to maintain substantially a constant depth of operation without the use of gauge wheels or the like. More particularly, it is a feature of this invention to provide a field cultivator hitched to the tractor and supported thereby in such a way as to maintain a substantially constant depth of operation, which may be controlled as desired, even when the field is uneven or rolling and whereby the depth of operation is substantially maintained even though the tractor may tip upwardly or downwardly when passing over uneven ground.

Another important feature of the present invention is the provision of a tractor-propelled implement wherein the draft pull is, in effect, balanced against the weight of the implement and/or the weight and suck of the ground working tools and in which vertical movement of the implement relative to the tractor is accommodated without having any substantial effect on the depth of tools during operation. Further, it is a feature of this invention to provide an implement of this kind particularly adapted for use with tractors having a power lift unit and wherein the connections are such that operation of the power lift unit serves to control the depth of operation, which is substantially maintained, and may also be utilized to raise the tools into their transport position easily and rapidly.

These and other objects and advantages of the present invention will be apparent to those skilled in the art after a consideration of the following detailed description, taken in conjunction with the accompanying drawings.

In the drawings:

Figure 2 is a similar side view showing the front portion of the tractor mounted field cultivator shown in Figure 1.

Figure 3 is an enlarged detail view taken generally along the line 3—3 of Figure 1.

Figure 4 is a view taken generally along the line 4—4 of Figure 1.

Figure 5 is a view taken generally along the line 5—5 of Figure 1.

Figures 6 and 7 are fragmentary side views illustrating the manner in which the cultivator of the present invention adapts itself to uneven terrain while maintaining substantially constant depth of operation.

Figure 8 is a view similar to Figures 6 and 7, showing the cultivator in its raised position.

Figures 9 and 10 show a modified form of the invention.

Figure 1:
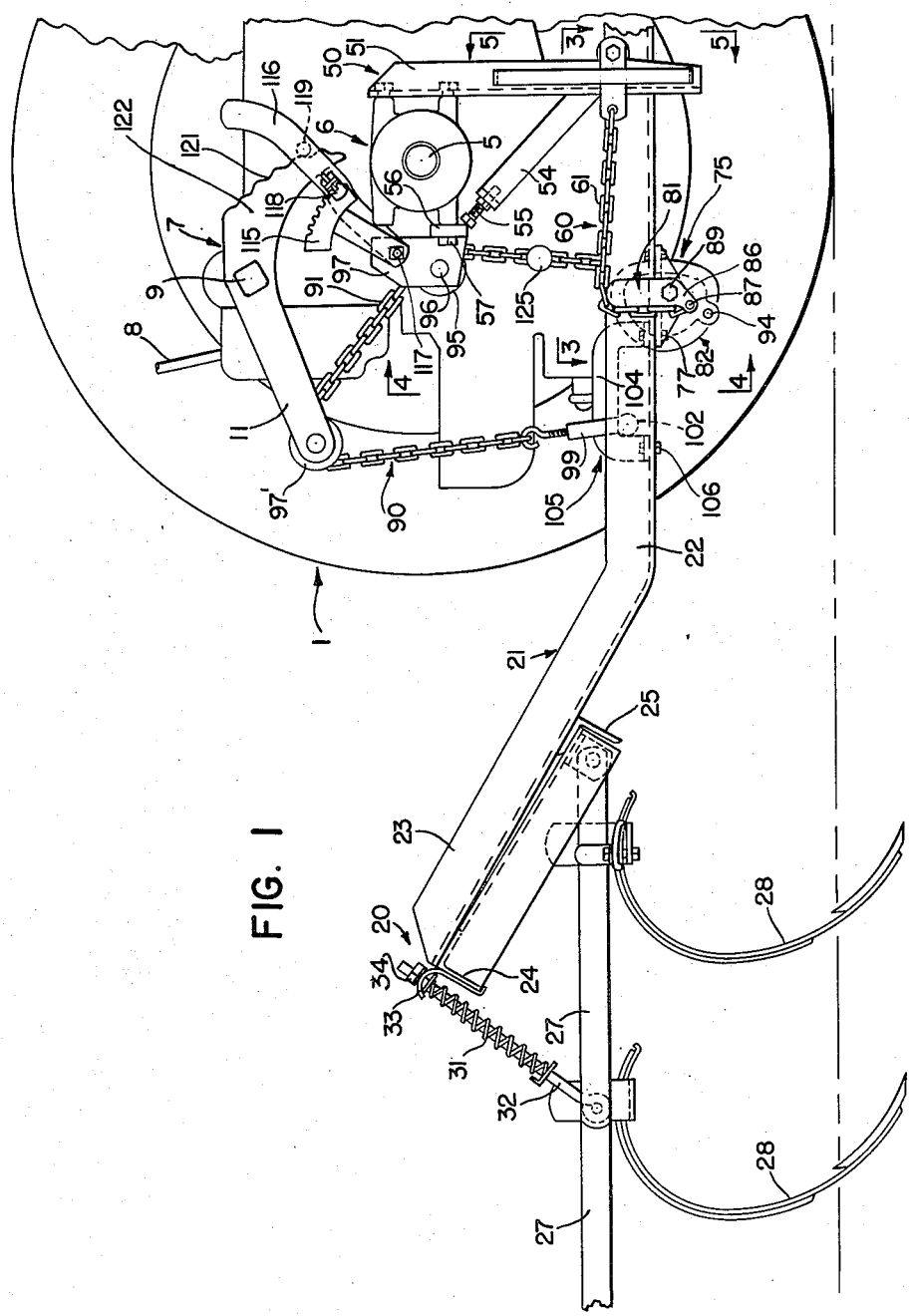
Figure 1 is a side view of the rear portion of a tractor mounted field cultivator in which the principles of the present invention have been incorporated.

Referring now to the drawings, particularly Figures 1 and 2, the tractor on which the implement of the present invention is mounted, is indicated in its entirety by the reference numeral 1 and so far as the present invention is concerned is largely conventional. The tractor 1 is provided with a frame 2 containing or supporting a power plant, such as a gasoline engine, and is carried on front wheels (not shown) and a pair of relatively widely spaced rear traction wheels 4 fixed to axle shafts 5 that are journaled for rotation in a rear axle structure 6. The tractor 1 is also provided with a power lift unit 7 which includes suitable operating mechanism, including a valve operating lever 8, and a rockshaft 9 on which power lift arms 11 are secured for movement between a lowered position and an upper or raised position.

The implement chosen to illustrate the present invention is shown as a spring tooth field cultivator indicated in its entirety by reference numeral 20. The cultivator 20 incorporates a frame 21 which includes right and left hand generally longitudinally extending frame bars 22, preferably in the form of angles, the rear ends of which are turned upwardly, forming upwardly and rearwardly angled sections 23. On the latter sections is fixed a pair of transverse angles 24 and 25, which together with suitable cross bars, form means for receiving a plurality of drag bars 27 which are pivoted to the front angle 25 and which carry rear cultivator teeth 28. The drag bars are normally held in operating position by a plurality of compression springs 31 disposed above pressure rods 32 that are pivoted at their lower and rear ends to the associated drag bars and which at their upper ends pass through brackets 33 against which the upper ends of the springs 31 bear, as thus shown in Figure 1. A lock nut 34 or the like limits the downward movement of each rod 32 relative to the associated bracket 33. The forward ends of the frame bars 22 are connected together by suitable cross braces (not shown) and are connected by strap members 36 to a hitch structure 37 which comprises generally fore and aft swinging links 38 pivotally connected at their upper ends, as at 39, to an adjacent portion of the tractor frame and at their lower ends, as at 41, the links 38 are pivoted to the strap members 36. This structure permits the implement frame 21 to shift generally fore and aft, but the front end is held against any substantial amount of generally vertical movement. A draft bracket 50 is fixed at each side of the tractor, preferably to the outer end portion of the associated rear axle structure 6 and preferably takes the form of an angle 51 secured, as by studs 52, to the axle housing. The angle 51 extends downwardly and its lower end carries an upwardly and rearwardly extending bracing strut 54, the upper end of which is provided with an adjusting set screw 55 that is adapted to bear against a bar 56 that is bolted, at 57, to the rear side of the axle housing 6. A generally horizontally extending draft connection 60 is provided and is preferably in the form of a chain 61 which at its forward end is connected by a link 62 (Figure 3) to a bar 64 which at its forward end carries a stud 65 on which a roller 66 is journaled. The roller 66 bears against the forward edge 67 of the angle 51 and thereby provides for generally vertical movement of the draft connection 60 relative to the tractor while receiving draft therefrom. The lower portion 67a of the edge 67 slants rearwardly, as best shown in Figure 2, for a purpose which will be explained later. There is a draft bracket structure 50, as described above, fixed at each side of the tractor 1 and there are two draft connections 60, one at each side of the tractor connected to the draft brackets 50 for vertical movement relative thereto. Each draft bracket angle 51 is provided with a vertical strap member 68 that embraces the link 64 for holding the latter and the roller 66 in position while accommodating vertical movement relative to the tractor. The strap member 68 has its upper and lower ends 69 turned laterally and secured, as by welding, to the outer flange of the associated draft bracket angle 51.

The rear end of each draft connection 60 is received by and connected to a cam member 75 that is mounted for rocking movement on the tool frame 21 for rocking movement about a generally transverse axis by any suitable means, such as a journal box 76 that is secured, as by bolts 77, to the horizontal flange of the associated frame angle or frame bar 22. Each of the cam members includes an outer cam section 81 and an inner cam section 82 rigidly fastened together as by a cross shaft 83 which is received in the journal box 76. The cam section 81 is preferably formed as an elongated member having a grooved periphery, as indicated at 85, and a bifurcated extension 86 which is apertured to receive a pin 87 that connects the rearmost link of the chain 61 to the cam section 81, with the chain received in the groove 85 of the cam section 81. The outer end of the shaft 83 is drilled and tapped to receive a cap screw 89, or other suitable means, for fastening the cam section 81 rigidly to the shaft 83. Preferably, the outer end of the shaft is flattened or otherwise formed to definitely locate the cam section 81, so far as its angular position is concerned, relative to the inner cam section 82.

A lifting connection, indicated in its entirety by the reference numeral 90, extends from each of the inner cam sections 82 upwardly to a point on the tractor. As best shown in Figures 1 and 4, each lifting connection includes the chain 91 or other flexible elements, the lower end of which is received in the grooved portion 93 of the inner cam section 82, the lower end of the chain 91 being connected, as by a pin or bolt 94, to the member 82. The chain 91 extends upwardly from the cam section 82 over the roller 95 that is journaled for rotation on a shaft 96 that is carried by a bracket 97 bolted to the rear side of the associated portion of the tractor rear axle 6. From the roller 95, the chain 91 extends upwardly and rearwardly over a sheave 97′ that is carried at the outer end of the power lift arm 11 at that side of the tractor, and from the sheave 97′ the chain 91 extends downwardly to a threaded hook bolt 98 that is adjustably connected into a swivel member 99. The latter member has a lower bifurcated section which is apertured to receive a pin 102 on which a roller 103 is mounted. The roller 103 bears against the lower edge of the central portion 104 of an elongated bracket 105 that is secured to the associated frame angle 22, preferably by a bolt 106 and the bolt 77 that connects the rear portion of the journal box 76 to the frame angle 22. As best shown in Figure 1, the inner cam section 82 is approximately semi-circular in configuration and bears a given angular relationship with respect to the associated outer cam section 81. The bracket 97 is secured, as by welding, to the bar 56 that is bolted to the rear axle housing mentioned above. Mounted on each of the brackets 97, preferably the upper portion thereof, is a notched sector 115, the sector 115 being rigid with respect to the bracket 97, and a hand lever 116 is pivoted, as at 117, to the bracket 97 and includes spring biased detent mechanism 118 which operates along the sector 115 the notches of which are tapered so that the detent slides out when the lever 116 is pulled in either direction. The hand lever 116 carries a stud 119 which cooperates with a notched portion 121 on an extension 122 of the associated power lift arm 11. The extension 122 is shaped so that swinging the hand lever 116 positions the stud 119 so as to serve as a stop for locking the associated power lift arm 11 against downward movement, whereby, according to the position of the hand lever 116, the power lift arm is held in different or various lowered positions, as desired, but when the valve lever 8 of the power lift unit 7 of the tractor is operated, each of the power lift arms 11 may be swung upwardly into a raised position. Any other suitable means for adjustably fixing the lowered position of the power lift arms 11 may be used, if desired.

The operation of the implement as described above is substantially as follows.

Figures 1 and 2 show the parts in their normal or operating position. When the tractor 1 is driven forwardly a forward pull is transmitted through the chains 61 to the cam sections 81. This tends to rotate each of the cam members 75 in a clockwise direction, as viewed in Figure 1. This rotation is opposed by the lifting connections 90. It will be seen that the lower end of each of the chains 91 is connected to the inner cam section 82 and is trained over the forward portion of the section 82, as shown in Figure 1, whereby any clockwise rotation of the cam member 75 acts through the lifting connection 90 to raise the rear end of the frame 21, it being remembered that the power lift arms 11 are locked by the hand lever 116 in the positions shown.

Thus, the draft pull is balanced against the weight of the implement frame and the suction of the tools 28. Hence, if there should occur an increase in the draft pull, transmitted from the tractor to the implement through the chains 61 trained over the outer cam sections 81, the cam members 75 are rotated in a clockwise direction, as viewed in Figure 1, and since the lower ends of the lifting chains 91 are trained over the inner cam sections 82 on the forward side thereof, such clockwise rotation of the cam members 75 acts to shorten the effective length of the lifting chains 91 and thus raises the tools into a more shallow depth of operation. If, on the other hand, the draft pull transmitted to the draft connections 61 should decrease, the suction of the tools and the weight of the frame act through the lifting chains 91 to cause the cam members 75 to be rotated in a counterclockwise direction so as to permit the frame and tools to take a lower position relative to the tractor. The cam sections 81 and 82 of each cam member 75 are so angularly related that the draft pull is always balanced against the weight of the implement and suction of the tools, whereby the tools under normal conditions maintain a substantially constant depth of operation, any displacement therefrom resulting in a change in the position of the cam members 75 which, in turn, sets up restoring forces. The position of the parts shown in Figure 1 represents a normal operating position, where the effective moment arm of the draft chains 61 is relatively great while the effective moment arm of the lifting chains 91 is relatively small. It will be seen from Figure 1 that if the draft pull should increase the clockwise swinging of the outer cam sections 81 would result in shortening the moment arm of the draft chains 61 while, at the same time, increasing the effective moment arms of the lifting chains 91, thereby bringing the cam members 75 into positions where the suction of the tools and the weight of the same become sufficient to oppose any further tendency of the draft pull, transmitted to the lifting chains 61, to rotate the cam members 75, whereby the parts are brought to equilibrium.

The arrangement just described is particularly advantageous in that it will be noted that the rear end of the tool frame is not rigidly tied to the rear end of the tractor, and hence the front end of the tractor may oscillate upwardly or downwardly without having any great effect upon the position of the implement relative to the ground or the depth of operation. That is, if the front end of the tractor should drop into a depression, the power lift arms 11 are raised since the rear axle of the tractor becomes the pivot point, and this tends to raise the rear end of the tool frame and pull the tools out of the ground or at least into a position of more shallow operation. The resultant decrease in the draft pull transmitted through the chains 61 would permit the weight of the frame and the suction of the tools to cause the latter to move downwardly, relative to the tractor, so as to accommodate for the lower position of the front end of the tool frame, thus securing a substantially constant depth of operation. Likewise, if the front end of the tractor should pass over a ridge, which would elevate the front end of the tool frame and ordinarily tend to permit the tools to move into a deeper position of operation, the resulting increase in the draft would momentarily cause the cam sections 75 to be rotated in a clockwise direction which would wind up on the lifting chains 91 and thus tend to lift the rear end of the tool frame into a more shallow position of operation. Thus, the implement of the present invention operates at substantially a constant depth of operation even over rough or uneven terrain. When desired, the power lift arms may be raised or lowered from the position shown in Figure 1 in order to change the normal position of equilibrium relative to the tractor and thus, in effect, change the normal depth of operation of the tools. Also, when it is desired to raise the tools out of the ground, as for transport, the power lift valve 8 is operated to raise the arms 11 into their fully raised position. This initially pulls upwardly on both sections of the chain 91, raising the rear end of the frame, but in order to provide a more rapid lift, I secure an abutment or stop 125 on the forward portion of the lifting chain, a short distance above the associated cam section 82. Each abutment stop 125 is of sufficient size so that when it is brought upwardly into contact with the associated roller 95, it also engages the associated bracket 97 and so prevents further upward movement of the forward section of the chain 91. Hence, subsequent movement of the power lift arms 11 into their fully raised position acts through the rear sections of the chain 91 to rapidly raise the tools into their transport position.

The position of the parts shown in Figure 1 is that for shallow cultivation, and if deeper cultivation is desired, the hand levers 116 are operated to permit the power lift arms 11 to lower. Not only does this provide for lowering of the entire draft responsive linkage, the rollers 66 shifting downwardly along the front edges 67 of the draft angles 51, but also, and more importantly, the lowering or raising of the power lift arms 11 causes the cam members 75 to take different positions to accommodate the required change in the relation of the lift arm to the draft arm for deeper or shallower work. For various cultivating depths the draft chains 61 are always operating in a generally horizontal plane. However, for the deeper positions, the rollers 66 engage the rearwardly inclined edges 67a. This serves to prevent undesirable upward shifting of the rollers 66 and thereby secures better stability when operating at the deeper positions where, because of the tooth depth, small differences in the ground resistance against the tools 28 would change the draft forces rapidly. For generally normal penetration under average conditions the draft cams 75 are rotated forwardly about 45° from their positions shown in Figure 1.

Figure 6 shows the position of the equalizing cams and associated parts when the cultivator traverses a ditch or low place, which is generally about the same as when the front wheels of the tractor drop into a low place or ditch. In this position of the implement, the cultivator has been shifted several inches forwardly relative to the tractor and the equalizing cams have been rotated in a counterclockwise direction (Figure 1). Since now the moment arm of the lifting chain is appreciably greater than the moment arm of the draft chain, the tendency is for the tools to move downwardly relative to the tractor and so maintain a substantial depth of operation. Thus, when the outfit traverses a ditch or the like, the tools automatically move downward so as to maintain a fairly constant depth of operation. Figure 7 shows the parts when the cultivator passes over a ridge or hump in the soil. As the rear end of the cultivator moves upwardly relative to the tractor the cultivator frame shifts generally rearwardly, the cam sections moving into a position where the moment arm of the lifting chain is increased which effectively balances the draft pull.

In general, the deeper the operating depth, the lower will be the points at which the rollers 66 normally engage the draft angles 51. If, however, the cultivator should be set deep enough to stall the tractor and cause the wheels to spin and sink into the ground, the resultant lowering of the rear end of the tractor relative to the tool frame causes the front portion of the lifting chain 91 to go slack, approximately twice the rate of lowering of the tractor relative to the tool frame. This permits the tractor to move forward a short distance until the clockwise rotation of the cam members takes up the slack. Under these conditions, as the tractor moves forwardly the connection point 87 on each cam member swings around into an upper position, beyond that shown in Figure 7, for example, momentarily increasing the moment arm of the draft connection so that as the tractor reaches the end of the slack in the lifting chain the cultivator is lifted out of its stalled position. Also, under these conditions where the wheels tend to mire into the ground, the rollers 66 move upwardly along the front edges of the draft angles 51, thus preventing the draft connection from pulling the cultivator down into the ground again and stalling the tractor.

Figures 9 and 10 illustrate a modified form of the present invention, somewhat simpler than the form of the invention described above. Referring now more particularly to Figure 9, the cultivator and frame are substantially the same as described above and hence have been indicated by the same reference numerals. In one particular, however, the cultivator frame 21 differs slightly from the construction shown in Figure 1. As best shown in Figure 10 the vertical flange of each frame bar 22 is apertured and a short section of reenforcing channel 131 is welded to each frame bar 22, the vertical flange of the reenforcing section 131 being apertured to receive the shaft 83 of the cam member 75. In the form of the invention shown in Figures 9 and 10, the cam members 75 are of substantially the same construction and configuration as shown in Figures 1 et seq., and hence the same reference numerals have been used. In the form of the invention shown in Figures 9 and 10, a lift chain 133 is connected at its lower end, as at 94, to the lift cam section 82. The chain 133 extends upwardly, passing over a roller 135 carried on the associated power lift arm 11, and from the roller 135 the chain 133 extends forwardly to a hook member 136 fastened to the rear axle housing 6 at that side of the tractor. A draft chain 141 is connected at its rear end, as at 87, to the draft cam section 81 of the cam member 75, the chain 141 extending forwardly and at its forward end being connected to a generally longitudinally extending elongated draft link 142, the forward end of which is connected by a swivel 143 to the lower end of a draft bracket or plate 144 bolted to the side of the tractor, as by a bolt 147 and the bolt 139 that pivotally connects the upper end of the link 38 to the tractor.

In this form of the invention the cultivator is quite easy to assemble and may quickly and easily be attached to or removed from the tractor. The relatively long draft connection 141, 142 between each draft arm or cam 81 and the forward portion of the tractor provides for a substantially horizontally applied draft pull in the several positions of the cultivator relative to the tractor, and the operation of the implement shown in Figures 9 and 10 is substantially the same in principle as the implement shown in Figures 1–8 and described above.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement adapted to be connected with a tractor to be propelled thereby, comprising a tool frame, ground working tool means having suction carried by the rear portion of said frame, means for connecting the forward portion of the frame with the tractor for generally free fore and aft movement relative to the tractor, a generally forwardly extending draft connection, means for connecting the forward end of said draft connection to the tractor for generally vertical movement relative thereto, a generally upwardly extending lifting connection adapted to be connected at its upper end to the tractor, and shiftable motion transmitting means connected with the tool frame and said draft and the rear end of said lifting connection whereby the draft pull transmitted by said draft connection is directed differentially against said tool frame to propel the same and against said lifting connection to oppose the weight of said frame and the suction of said tool means.

2. An agricultural implement adapted to be connected with a tractor to be propelled thereby, comprising a tool frame, ground working tool means having suction carried by the rear portion of said frame, means for connecting the forward portion of the frame with the tractor for generally free fore and aft movement relative to the tractor, a generally forwardly extending draft connection adapted to be connected at its forward end to the tractor, a generally upwardly extending lifting connection, shiftable motion transmitting means movably mounted on said frame, means for connecting one end of said lifting connection with said motion transmitting means, means for connecting the other end of said lifting connection with said tool frame, means for connecting the intermediate portion of said lifting connection with the tractor, and means for connecting the rear end of said draft connection to said motion transmitting means, whereby the draft pull transmitted by said draft connection is directed differentially against said tool frame to propel the same and against said lifting connection to oppose the weight of said frame and the suction of said tool means.

3. A tractor propelled implement adapted to be attached to a tractor to be propelled thereby, comprising a frame adapted to extend generally longitudinally of the tractor, ground working tools carried by the rear portion of said frame generally rearwardly of the tractor, generally fore and aft shiftable means adapted to connect the forward end of the frame to the tractor and prevent generally vertical movement of the front end of said frame relative to the tractor, a draft connection between said frame and the tractor, and means connected with the draft connection and thereby responsive to the amount of draft pull for raising the rear portion of the frame relative to the tractor, said last mentioned means comprising a sheave-like member pivotally mounted on said frame and having two generally non-circular sections connected to rotate together, one receiving said draft connection, and a flexible element connected at its lower end with the other of said sheave-like sections and extending upwardly therefrom to a point of connection with the tractor.

4. A tractor propelled implement adapted to be attached to a tractor to be propelled thereby, comprising a frame adapted to extend generally longitudinally of the tractor, ground working tools carried by the rear portion of said frame generally rearwardly of the tractor, generally fore and aft shiftable means adapted to connect the forward end of the frame to the tractor and prevent generally vertical movement of the front end of said frame relative to the tractor, a draft connection between the intermediate portion of said frame and the tractor and including a horizontally disposed part adapted to be connected at its forward end with the tractor for vertical shifting movement relative to the tractor, means connecting the rear end of said part with the frame, said latter means including a member movable relative to the frame in response to the amount of draft pull exerted between the tractor and said frame, and means connecting said member with the tractor at a point above said frame whereby movement of said member serves to raise and lower said frame, said part remaining generally horizontal in different vertical positions of said frame relative to the tractor.

5. An agricultural implement adapted to be connected to a tractor to be propelled thereby, comprising a tool frame adapted to extend longitudinally of the tractor, means for connecting the front end of said tool frame with a forward portion of the tractor for generally free fore and aft movement relative thereto, ground working tool means having suction carried by the rear portion of said tool frame, a generally horizontally extending draft connection adapted to be connected at its forward end with the tractor to receive draft therefrom, a cam member rockably connected with said tool frame and including a pair of cam sections, one receiving the rear portion of said draft connection, and a lifting connection received by the other cam section, said lifting connection having a flexible member fixed at one end to said other cam section and at its other end to said tool frame, the intermediate portion of said lifting connection being adapted to be connected with the tractor, said cam sections being so angularly related that the draft pull transmitted through said draft connection tends to rotate said cam member in one direction while the weight of the tool frame and the suction of said tools tend to rotate said cam member in the other direction, whereby the draft pull is balanced against the suction of the tools and the weight of the frame so as to maintain substantially constant depth of operation.

6. A field cultivator adapted to be mounted on a tractor, said cultivator comprising a frame adapted to be disposed generally longitudinally of the tractor, a flexible element connected at one end to the tool frame at one side thereof and upwardly to a point of connection with the tractor and then downwardly toward said frame, a double cam member having a first cam section, receiving the other end of the associated flexible element, and a second cam section, and a flexible draft element connected at its rear end to said second cam section and adapted to be connected at its forward end to the tractor in draft transmitting relation, the angular relation between the cam sections of said double cam member being such that the weight of said frame tends to rotate said cam member in one direction and the draft pull transmitted by said draft element tends to rotate said cam member in the other direction.

7. A field cultivator comprising a mobile support, a tool frame extending generally longitudinally thereof, hitch means connecting the forward end of said frame with said support for generally fore and aft movement relative thereto, a pair of interconnected cam members mounted for rocking movement on the generally rearward portion of said frame, a generally longitudinally extending draft element connected between one of said cam members and said support so as to receive draft therefrom, and a generally upwardly extending lifting element connected between the other cam member and said support, said cam members being so angularly related that in operation the draft pull is counterbalanced against the effective weight of said frame and tool means and any tendency for the tool means to run into the ground, whereby substantially constant depth of operation is secured.

8. A field cultivator adapted to be connected to a mobile support to be propelled thereby, comprising a tool frame, hitch means adapted to connect the forward end of said frame with said support for generally fore and aft movement relative thereto, a pair of interconnected cam members mounted for rocking movement on the generally rearward portion of said frame, a generally longitudinally extending draft element adapted to be connected between one of said cam members and said support so as to receive draft therefrom, and a generally upwardly extending lifting element adapted to be connected between the other cam member and said support, said cam members being so angularly related that in operation the draft pull is counterbalanced against the effective weight of said frame and tool means and any tendency for the tool means to run into the ground, whereby substantially constant depth of operation is secured.

9. An agricultural machine adapted to be connected with a tractor, said implement comprising a tool frame, tool means carried thereby, a generally horizontally extending draft connection adapted to be connected at its forward end with the tractor, a generally upwardly extending lifting connection, motion transmitting means carried by the tool frame and receiving the rear end of said draft connection and the lower end of said lifting connection whereby the weight of the frame and the suction of the tool means is balanced against the draft pull so as to maintain substantially constant depth of operation, said lifting connection comprising a flexible element, a sheave carried by the tractor and receiving said lifting connection, one end of the latter being connected to the above mentioned motion transmitting means and the other end being connected with said tool frame, means for raising said sheave, and stop means acting between the portion of said lifting connection at one side of the sheave and the tractor, whereby movement of said sheave in an upward direction raises said tool frame at a rate of movement that is greater than the vertical movement of said sheave.

10. The invention set forth in claim 7, further characterized by said mobile support having an upwardly swingable arm carrying a sheave, and said upwardly extending lifting elements being trained over said sheave and extending downwardly to a point of anchorage on said tool frame.

11. The invention set forth in claim 7, further characterized by said cam members being grooved and said draft and lifting elements being flexible and having portions disposed in said grooves and connected with said cam members.

12. The invention set forth in claim 11, further characterized by the grooved portions of said cam members being so shaped that when said members are rocked in one direction or the other from a generally central position, the effective moment arm of one of said elements is increased while the effective moment arm of the other element is decreased.

13. The invention set forth in claim 7, further characterized by a sheave adapted to be carried by said mobile support and receiving the upper portion of said lifting element, and means for connecting the upper end of said element with said support.

14. The invention set forth in claim 7, further characterized by the forward portion of said draft element extending alongside the tool frame, and means for connecting the forward end of said draft element with the forward portion of said mobile support.

15. The invention set forth in claim 7, further characterized by said hitch means comprising a swingable link adapted to be pivotally connected with said support and pivotally connected to the forward portion of said tool frame, and means for connecting the forward end of said draft element with said mobile support at a point adjacent said swinging link.

16. The invention set forth in claim 7, further characterized by means for connecting the forward end of said draft element to the forward portion of said mobile support, and means for adjustably connecting the upper portion of said lifting element with said mobile support.

17. The invention set forth in claim 7, further characterized by a sheave adapted to be connected with said mobile support and receiving the upper portion of said lifting element, the latter being flexible and extending forwardly from said sheave, and means for connecting the forward end of said lifting element to said mobile support.

JOHN H. STARR.

REFERENCES CITED

The following references are of record in the file of this patent:

UNITED STATES PATENTS

| Number | Name | Date |
| --- | --- | --- |
| 2,354,250 | Evans | July 25, 1944 |
| 2,366,155 | Silver | Jan. 2, 1945 |
| 2,436,155 | Silver | Feb. 17, 1948 |
| 2,462,641 | Hyland | Feb. 22, 1949 |

FOREIGN PATENTS

| Number | Country | Date |
| --- | --- | --- |
| 338,256 | Germany | June 15, 1921 |